INVENTOR.
RAYMOND J. ROGERS
BY Arthur L. Bowers
AGENT
Lon D. Cogglesh...
ATTORNEY INVENTOR.
RAYMOND J. ROGERS
BY Arthur S. Bowers
AGENT
Lon B. Appleton
ATTORNEY INVENTOR
RAYMOND J. ROGERS
BY Arthur L. Bowers
AGENT
Lon B. [signature]
ATTORNEY INVENTOR
RAYMOND J. ROGERS
BY Arthur L. Bowers
AGENT
Lom B. Applebaum
ATTORNEY United States Patent Office 3,555,426

Patented Jan. 12, 1971

3,555,426

FREQUENCY SYNTHESIZER

Raymond J. Rogers, Rochester, N.Y., assignor, by mesne assignments, to the United States of America as represented by the Secretary of the Navy Filed May 29, 1968, Ser. No. 733,071
Int. Cl. H03b *21/02*
U.S. Cl. 325—184 2 Claims

ABSTRACT OF THE DISCLOSURE

In a transmitter having a plurality of frequency conversion circuits, a synthesizer that is DC tunable to 11.0 or 11.5 kc. with the stability and accuracy of a frequency standard in the transmitter, through selection of respective indexed settings, and also operable to activate a continuously adjustable vernier resistive voltage divider to enable continuous adjustment of the synthesizer to any frequency over one kc. of a frequency range whereby the synthesizer is operable to set the transmitter to two tuned frequencies 500 cycles per second apart for every frequency setting of the higher order frequency conversion circuits or for continuous vernier tuning over at least a one kc. frequency range that brackets the 11.0 and 11.5 kc. tuned frequencies for every frequency setting of the other higher order frequency conversion circuits.

An object of this invention is to improve the tuning of wide band transmitters.

Other objects and advantages will appear from the following description of an example of the invention and the novel features will be particularly pointed out in the appended claims.

Figure 1:
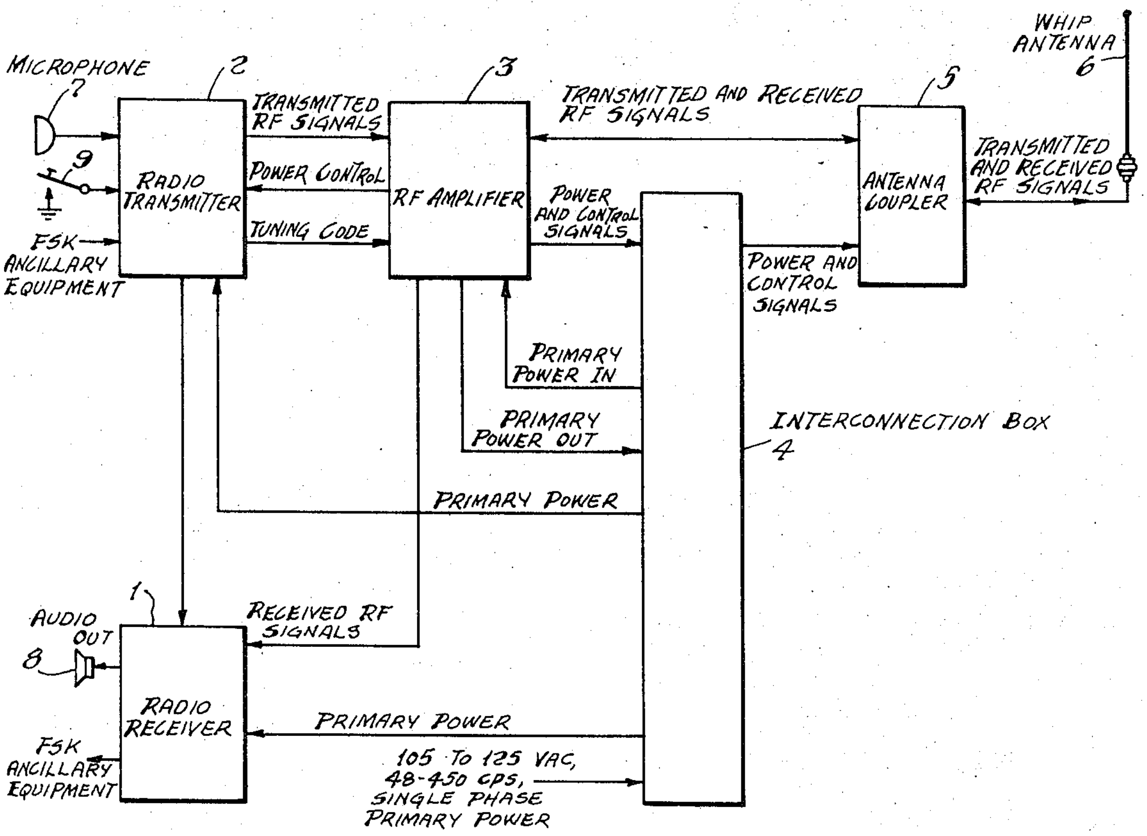
Figure 2A:
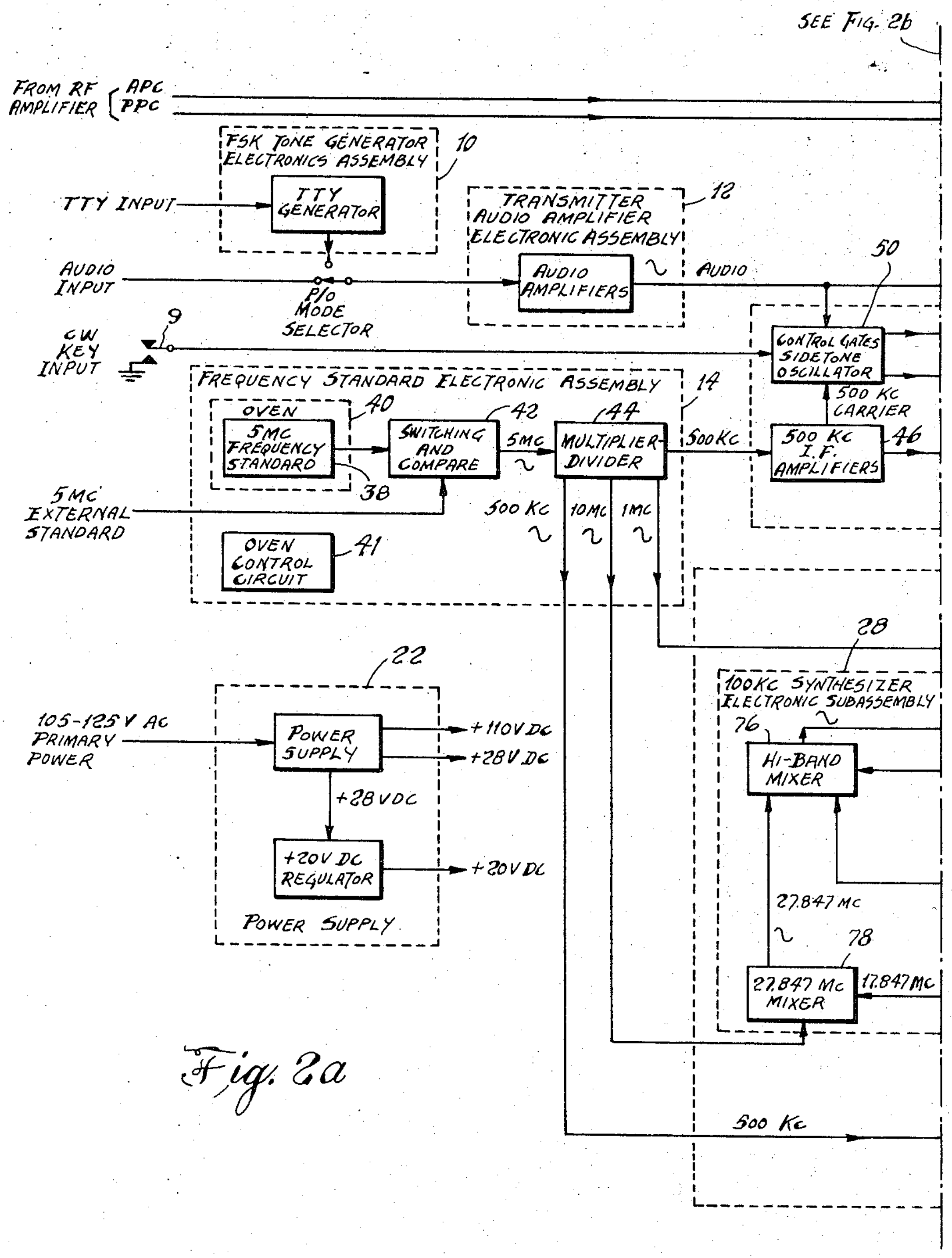
Figure 2B:
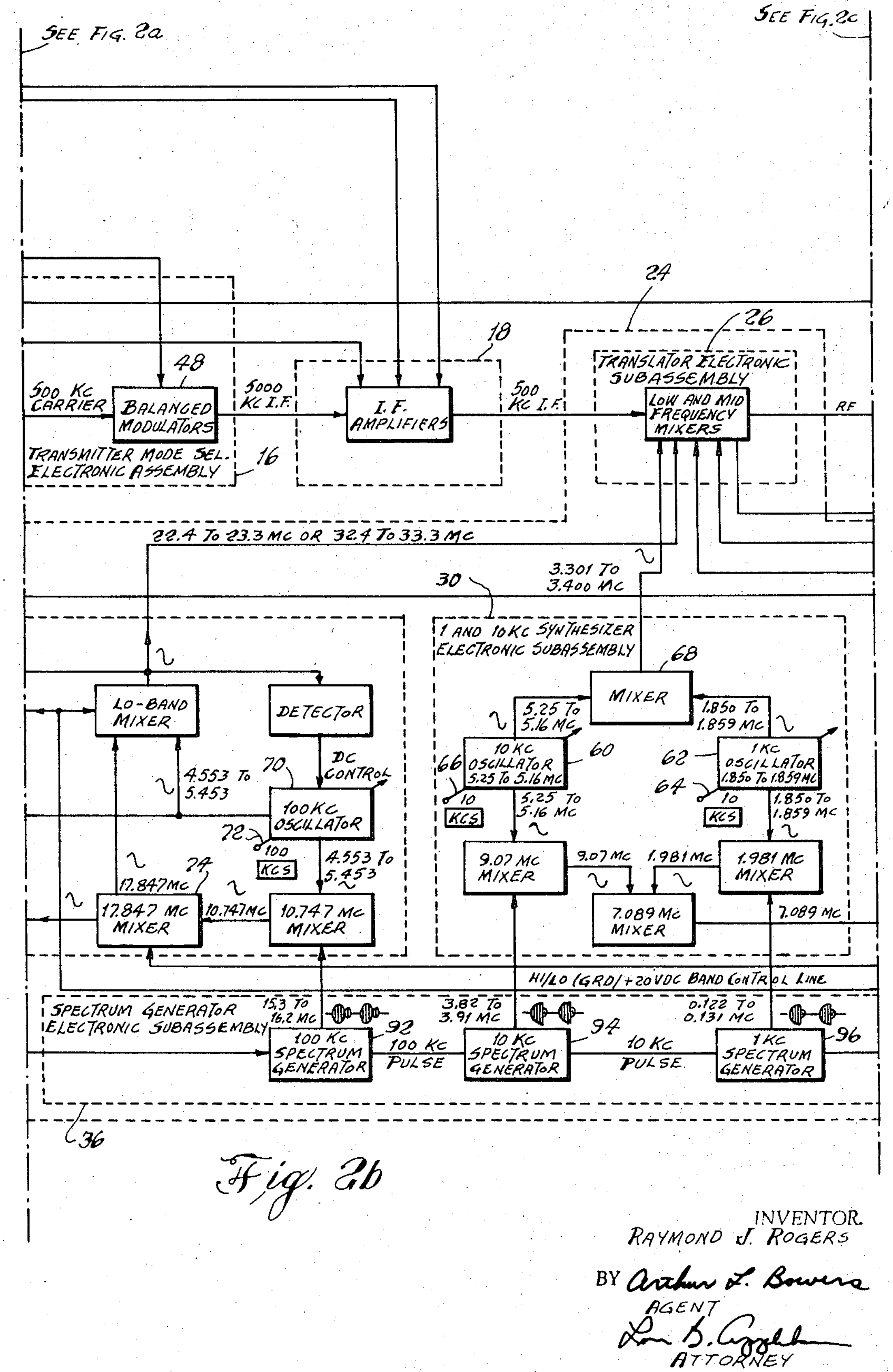
Figure 2C:
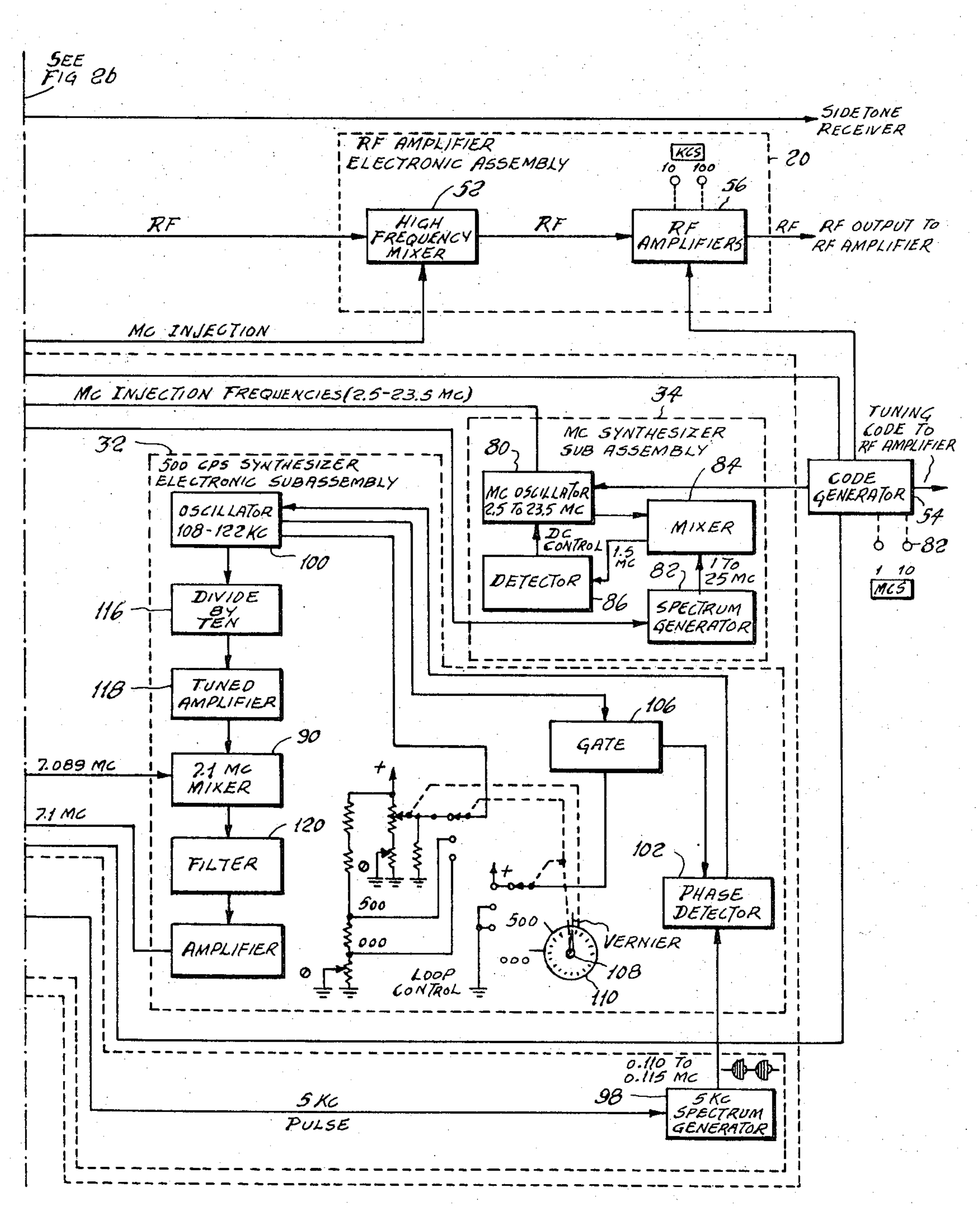

In the accompanying drawings:

FIG. 1 is a block diagram of radio equipment of the type in which this invention is included, and FIGS. 2*a*, 2*b*, and 2*c* are portions of a block diagram of the transmitter in FIG. 1 and including improvements according to this invention.

The communication system shown in FIG. 1 includes a radio receiver 1, a radio transmitter 2, and RF amplifier 3, interconnection box 4, antenna coupler 5, and exemplary antenna 6, which is one of several. The communication system is capable of transmitting and receiving upper sideband (USB), lower sideband (LSB), continuous wave (W), compatible amplitude modulation (AM) and frequency shift keying (FSK) signals on any one of 56,000 channels in the frequency range of 2.0 to 29.9995 mc. In addition vernier control, not shown in FIG. 1 provides continuous tuning, allowing reception to be made on any frequency in the frequency range 2.0 to 30.0 mc.

The primary power source, not shown, for the communication system is coupled to interconnection box 4, which routes power to RF amplifier 3, where it is used to produce the required operating voltage and is routed back to the interconnection box. The primary power is then routed to the transmitter 1 and receiver 2 to be used to produce the required operating voltage for these two units. The operating frequency for the transmitter is set up with front panel operating controls, not shown. A tuning code is generated in the transmitter and applied to the RF amplifier 3 to tune it to the same operating channel as the transmitter. The RF amplifier 3, in turn, generates a tuning code which is coupled through the interconnection box 4 to antenna coupler 5. This code is used to rough tune the antenna coupler. Fine tuning of the antenna coupler 5 is then accomplished using front panel controls on the RF amplifier 3. The operating voltage and control information for the antenna coupler is originated in the RF amplifier 3 and applied through interconnection box 4 to the antenna coupler 5.

In AM and SSB transmit modes of operation, the output from the microphone 7 is applied to the transmitter. Within the transmitter voice signals are amplified and used to modulate a 500 kc. local carrier, providing a 500 kc. IF. The resulting signal is a double sideband signal, filtered according to the mode of operation, amplified, and converted by a triple conversion process to the desired RF operating frequency. The RF signal is power amplified in the transmitter. In CW operation, the 500 kc. local carrier is inserted directly into the IF amplifiers at a coded rate. The signal is further processed in the same manner as the voice signals in the AM or SSB modes of operation. In FSK operation, the coded application of loop current is converted to audio frequencies representing marks and spaces. These audio signals are applied to the audio circuits of the transmitter. Thereafter, these signals are processed in the same manner as the voice signals in AM or SSB modes of operation. The RF output signal of the transmitter is applied to the RF amplifier 3 where it is amplified to a predetermined level of peak envelope power in SSB, a predetermined level of carrier power in AM, or a predetermined level of power in CW and FSK. Two DC control levels representing the average and peak RF output power, are fed back from the RF amplifier 3 to the transmitter 2 to prevent its RF output from exceeding a predetermined level. The RF output from the RF amplifier 3 is applied to the antenna coupler where it is routed through various impedance matching circuits to the system antenna for transmission. The antenna coupler matches the system whip antenna to the RF amplifier according to the operating frequency insuring maximum transfer of power.

In the receive mode of operation, the RF signals received at the system antenna are applied through the antenna coupler and the transmit receive switching circuit in the RF amplifier 3 to the receiver 1. The RF signals are amplified, converted to a 500 kc. IF by a triple heterodyning process, IF amplified, demodulated, and audio amplified in the receiver 1. The resulting intelligence is applied to a speaker 8 for monitoring or to FSK ancillary equipment, not shown, for print-out.

The transmitter 2 shown in FIGS. 2*a*, 2*b*, and 2*c* consists of eight electronic assemblies, circumscribed by broken lines, including FSK tone generator 10, transmitter audio amplifier 12, frequency standard 14, transmitter mode selector 16, IF amplifier 18, RF amplifier 20, power supply 22, and translator/synthesizer 24. One assembly consists of six electronic subassemblies, namely translator 26, 100 kilocycle per second (kc.) synthesizer 28, 1 and 10 kc. synthesizer 30,500 cycle per second (c.p.s.) synthesizer 32, synthesizer 34, and spectrum generator 36. These electronic assemblies and subassemblies convert audio or coded intelligence to one of the 56,000 possible operating RF frequencies in the 2.0–29.995 mc. frequency range for either LSP, USB, ISB, LSB, USB, ISB, CW, FSK or compatible AM mode of operation.

MAIN SIGNAL FLOW

The main signal flow in the transmitter originates in the 5 megacycle per second (mc.) frequency standard 38. The frequency standard circuit 38 is housed in an over assembly 40 maintained at a nearly constant temperature by oven control circuit 41. The 5 mc. frequency standard produces an accurate, stable reference frequency upon which all frequencies used in the transmitter are based. The accurate output from the 5 mc. frequency standard is applied to switching and compare circuit 42. An external 5 mc. frequency may also be applied to the switching and compare circuit. The switching and compare circuit routes the internal or external 5 mc. signal to multiplier-divider 44 or to the compare portion of the switching and compare circuit 42. The compare portion compares internal 5 mc. frequency with the external 5 mc. frequency for an indication of internal frequency accuracy. The 5 mc. output from the switching and compare circuit is applied to the multiplier-divider 44, which converts it to frequencies of 500 kc., 1 mc., and 10 mc. All three frequencies are used in the mixing processes required to produce the injection frequencies used in the RF conversion process. The 500 kc. frequency output from the multiplier-divider 44 also serves as the local carrier for the transmitter.

The 500 kc. local carrier output from the multiplier-divider 44 is applied to 500 kc. IF amplifiers 46. The latter circuits amplify the 500 kc. local carrier to a level suitable for use in balanced modulators 48. There are two balanced modulators in block 48, identical except for output filtering. The balanced modulator used is selected according to the mode of operation. One balanced modulator is used in the USB, FSK, AM, and ISB modes of operation. The other balanced modulator is used during the LSB and ISB modes of operation. Neither balanced modulator is used during the CW mode of operation. Audio intelligence from the audio amplifier is applied to the appropriate balanced modulator to modulate the 500 kc. local carrier, resulting in a double sideband signal without a carrier. The double sideband signal is filtered according to the mode of operation to remove either the LSB or USB portion of the signal.

The 500 kc. IF output from the balanced modulators is applied to the IF amplifiers. The IF amplifiers 18 provide a 500 kc. IF output at a level suitable for use in low and mid-frequency mixers 26. The level of the 500 kc. IF output from the IF amplifiers 18 is prevented from exceeding a predetermined peak and average power level by application of the average power control (apc) and peak power control (ppc) signals produced in RF amplifier 3. The 500 kc. local carrier is re-inserted into the 500 kc. IF signal during the AM mode of operation in the IF amplifiers 18. The unmodulated 500 kc. IF signal for CW mode of operation is also produced by this circuit. The 500 kc. carrier required in both the AM and CW modes of operation is applied to the IF amplifiers 18 by the control gates-sidetone oscillator 50.

Low and mid-frequency mixers 26 in conjunction with the high frequency mixer 52 of RF amplifier 20, convert the 500 kc. IF signal to the desired RF frequency by a triple conversion process. The 500 kc. IF signal is mixed with 1 and 10 kc. injection frequency by the low frequency mixer portion of 26 to produce a second IF frequency between 2.8 and 2.9 mc. further discussed below. This frequency is filtered and applied to the mid-frequency mixer portion of 26. The second IF is mixed with the 100 kc. injection frequency by the mid-frequency mixer or between 29.5 and 30.5 mc. The third IF used is determined by the hi/lo band control signal.

The output from the mid-frequency mixer is filtered and applied to the high frequency mixer 52. The third IF is mixed with the mc. injection frequency by the high frequency mixer to produce the desired RF output frequency. The mc. injection frequency is determined by the position at which the mc. frequency synthesizer 34 is set by the code from the code generator 54. Output from the high frequency mixer is applied to RF amplifier 56, which amplify the RF frequency to a level suitable to drive the RF amplifier 3 of FIG. 1. The input and output circuits of the RF amplifiers 56 are automatically tuned by the tuning code produced by the code generator 54, according to the frequency of the desired operating channel.

AUDIO SIGNAL FLOW

Intelligence is applied to the transmitter 2 either as coded keying for CW, coded keying for FSK, or audio for all the other modes of operation. The coded CW keying turns a gating circuit on and off in the control gates-sidetone oscillator 50. Each time key 9 is depressed, the gate is turned on allowing the 500 kc. local carrier to pass from the 500 kc. amplifiers 46 to the IF amplifiers 18. Also each time the CW key is depressed, the output of a sidetone oscillator in block 50 is gated through to the sidetone line. The sidetone signal is applied to the receiver 1, enabling the operator to monitor the CW keying.

Audio output from the microphone is applied to the audio amplifiers 12. When operating in the USB, ISB, AM, or FSK modes of operation, the audio input is amplified by one audio amplifier in block 12 and is applied to the appropriate balanced modulator 48. When operating in the LSB and ISB modes of operation, the audio is amplified by another audio amplifier in block 12 and applied to the appropriate balanced modulator. A gate for each audio amplifier in block 12 is turned on in the control gate-sidetone oscillator when the corresponding audio amplifier is urned on. This gate permits the audio to pass as a sidetone signal to receiver 1 enabling the operation to monitor the respective transmission. When operating in the FSK mode of operation, the coded TTY input is applied to the TTY generator in the FSK tone generator 10. The TTY generator produces the required mark and space frequencies to an audio amplifier in block 12. The gate for reinserting 500 kc. carrier in the IF signal during AM operation is also contained in the control gates-sidetone generator.

FREQUENCY GENERATION

The injection frequencies used in the first frequency conversion in the mixers 26 are generated in the 1 and 10 kc. synthesizer 30. The 1 and 10 kc. synthesizer has two crystal oscillators 60, 62 each of which has ten possible output frequencies. The 1 kc. oscillator 62 has a ten-step panel control 64 for setting the oscillator at any frequency step sarting with 1,850 mc. to 1,859 kc., 1 kc. apart. The 10 kc. oscillator 60 has a ten-step panel control 66 for setting the oscillator at any frequency step from 5.25 mc. to 5.16 mc., 10 kc. apart. The outputs from oscillators 60, 62 are subtractively mixed in mixer 68 to produce one of 100 possible frequencies spaced at 1 kc. intervals between 3.301 and 3.400 mc. The output of mixer 68 is applied to the low frequency mixer of block 26.

The injection frequencies used in the second frequency conversion in the mixers 26 are generated within the 100 kc. synthesizer 28. Synthesizer 28 has a crystal oscillator 70 which has a ten-step panel control 72 for setting the oscillator at any frequency step from 4.553 mc. to 5.453 mc., 100 kc. apart. If a lo-band injection frequency is required, the 17.847 mc. output from 17.847 mc. mixer 74 is additively mixed in the hi-band mixer 76 with the output from the 100 kc. oscillator 70, 4.553 mc. to 5.453 mc. in 100 kc. steps to provide a frequency in the 22.4 to 23.3 mc. range. If a hi-band injection is required the 27.847 mc. output from 27.847 mc. mixer 78 is additively mixed in the hi-band mixer 76 with the output from the 100 kc. oscillator 70, 4.553 mc. to 5.453 mc. in 100 kc. steps to provide a frequency in the 32.4 to 33.3 mc. range. In either case, the resultant frequency is applied to the mid frequency mixer in block 26.

The injection frequencies used in the third frequency conversion in the mixers circuit are generated within the mc. synthesizer 34 which consists of a phase-locked crystal oscillator 80 that is automatically tuned to produce one of seventeen frequencies between 2.5 mc. and 23.5 mc. The output is applied to the high frequency mixer 52. The output frquency is determined by the setting of panel MCS controls 82.

ERROR CANCELLATION

A combination of error cancelling loops and phase-locked loops is used in the frequency synthesizer circuits of the transmitter to ensure that the injection frequencies applied to the mixers are correct. The mc. synthesizer employs a phase-locked loop to ensure the accuracy of the mc. injection frequencies. The 1 mc. output from the multiplier-divider 44 in the frequency standard 14 is applied to the spectrum generator 82 to produce a spectrum of frequencies spaced at 1 mc. intervals between 1 mc. and 25 mc. The output from the spectrum generator and the output from the mc. oscillator are mixed in mixer 84. Any error in output from the mc. oscillator 80 is detected in detector 86 and an error voltage is produced. This error signal is applied to the mc. oscillator 80 to lock it to the correct frequency. The accuracy of the oscillator output is the same as that of the 5 mc. frequency standard.

The 100 kc. synthesizer 28 employs an error cancelling loop to ensure the accuracy of the 100 kc. injection frequencies. The 500 kc. output from the multiplier-divider is applied to the 100 kc. spectrum generator 92 to produce a spectrum of frequencies spaced at 100 kc. intervals between 15.3 mc. and 16.2 mc. The output from the 100 kc. oscillator 4.553 mc. to 5.453 mc., in 100 kc. steps is applied to the 10.747 mc. mixer, where it is mixed in mixer 88 with that spectrum point of the 100 kc. spectrum which will result in an output of 10.747 mc. The 10.747 mc. signal is additively mixed with the 7.1 mc. output from the 7.1 mc. mixer to produce the 17.847 mc. signal, which is used in one of two mixing processes. It is mixed with the 100 kc. oscillator output to cancel any oscillator frequency error and produce the lo-band injection frequencies, or it is mixed with the 10 mc. output from the multiplier-divider 44. This mixing produces a 27.847 mc. signal, which is mixed with the 100 kc. oscillator output to cancel any oscillator frequency error and produce the hi-band injection frequencies. The hi or lo-band of injection frequencies is determined by the voltage level on the hi/lo band control line output from the code generator. If an error were present in the 100 kc. oscillator output, it would be cancelled in this mixing scheme. This is accomplished as follows. Assume that the output from the oscillator 70 should be 4.553 mc., but is 200 cycles high, 4.5532 mc., and that the desired frequency output is 22.4 mc. in the lo band. The subtractive mixing of the oscillator output with whichever 100 kc. spectrum point will produce an output as close as possible to 10.747 mc., results in a 10.7468 mc. output (15.3 mc.—4.5532 mc.=10.7468 mc.). This signal is then additively mixed with the 7.1 mc. signal, producing a 17.8468 mc. output. The 17.8468 mc. signal is then additively mixed with the oscillator output (17.8468 mc.+4.5532 mc.=22.4 mc.), resulting in the desired 22.4 mc. output. Assume that the output from the oscillator should be 4.953 mc., but is 300 cycles low (4.9527 mc.), and that the desired frequency output should be 32.8 mc. (in the hi-band). Subtractively mixing the 100 kc. spectrum point (15.7 mc.) with the 4.9527 mc. signal results in an output of 10.7473 mc. This signal is then mixed with the 7.1 mc. signal, resulting in a frequency of 17.8473 mc. The 17.8473 mc. signal is further mixed with the 10 mc. signal to obtain a frequency of 27.8473 mc., which is additively mixed with the 4.9527 mc. output from the oscillator to obtain the required 32.8 mc. output. Therefore, it can be seen that any error existing in the output from the 100 kc. oscillator will be cancelled, resulting in the exact 100 kc. injection frequency required.

Any error existing in the 1 and 10 kc. oscillator is cancelled in the following manner. The 100 kc. pulses from the 100 kc. spectrum generator 92 are supplied to the 10 kc. spectrum generator 94 producing an output from 3.82 to 3.91 mc. in 10 kc. increments. The 10 kc. spectrum generator also produces 10 kc. pulses which are applied to the 1 kc. spectrum generator 96 to produce a spectrum of frequencies spaced at 1 kc. intervals between 0.122 mc. and 0.131 mc. The output from the 10 kc. oscillator 60 (5.25 mc. to 5.16 mc., in 10 kc. steps) is additively mixed with whichever spectrum point of the 10 kc. spectrum will result in a frequency of 9.07 mc. The output from the 1 kc. oscillator 62 (1.850 mc. to 1.859 mc., in 1 kc. steps) is additively mixed with whichever spectrum point of the 1 kc. spectrum will result in a frequency of 1.981 mc. The 1.981 mc. and the 9.07 mc. signals are then subtractively mixed, producing the 7.089 mc. signal, which contains the errors of both oscillators. The 1 kc. spectrum generator 96 also produces 5 kc. pulses, which are applied to the 5 kc. spectrum generator 98 to produce an output consisting of two spectrum points, 110 kc. and 115 kc. These spectrum points are used to lock the output frequency of the 500 c.p.s. phase-locked oscillator 100 to 110 kc. or 115 kc., when desired.

The 1 and 10 kc. synthesizer 30 provides an output to the 500 c.p.s. synthesizer 32 along a signal path which is part of the error cancelling loop for the 1 and 10 kc. synthesizer 30. The output from the 1 and 10 kc. synthesizer is mixed with injection from the 500 c.p.s. oscillator 100, to provide an input to the 100 kc. synthesizer 28. Since the 100 kc. synthesizer is in the error cancelling loop of the 1 and 10 kc. synthesizer, the output of the 500 c.p.s. synthesizer 32 contains any error from the 1 and 10 kc. synthesizer. Since cancellation of error of the 1 and 10 kc. synthesizer is accomplished along the signal path to the 100 kc. synthesizer, frequency displacement of this error signal appears as the same frequency displacement in the 100 kc. injection. This frequency displacement is not cancelled in the translator as is the error of the 1 and 10 kc. synthesizer. Thus 500 c.p.s. displacement of the nominal 7.1 mc. results in 500 c.p.s. displacement in the 100 kc. synthesizer injection into the translator 26, thus enabling conversion of signals in 500 c.p.s. increments with the stability and accuracy of the frequency standard.

The 500 c.p.s. synthesizer 32 is a phase-locked system. Oscillator 100 has voltage variable tuning capacitors that form an integral part of the oscillator's feedback network and is continuously tunable from 108 to 122 kc. through DC tuning voltage input to the oscillator. Phase detector 102 between the oscillator and spectrum generator 98 phase locks the output of the oscillator relative to the output of the spectrum generator. Patent application Ser. No. 683,512, filed Nov. 16, 1967 by Raymond J. Rogers et al. discloses an example of a phase detector and oscillator suitable herein. A DC controlled gate 106 couples output from the oscillator to the phase detector. The oscillator 100 and gate 106 is controlled from a panel switch 108 and vernier control 110. The panel switch has three positions, 000, 500, and vernier. In the switch positions 000 and 500 the oscillator frequency is locked at 110 kc. and 115 kc. respectively by application of the predetermined voltages from fixed voltage points along voltage divider 112 to the voltage variable tuning capacitors. In both the 000 and 500 the gate couples oscillator output to the phase detector. In the switch position for vernier operation, the gate 106 is open, there is no output from the phase detector to the oscillator and the vernier control 110 is operable to continuously tune the variable voltage capacitors over the frequency range.

The 5 kc. spectrum generator 98 provides the 110 kc. and 115 kc. spectrum frequencies that are used as references in the phase locked loop in the 000 and 500 switch positions. The output of the oscillator is locked in 5 kc. increments. To convert the 5 kc. increment to 500 c.p.s. increments, the output of the oscillator is divided down by a factor of 10 by divider 116. Thus, the output of the divider is in the range 10.8 kc. to 12.2 kc. during vernier operation and is 11.0 and 11.5 kc. in the locked 000 and 500 switch positions. The output from the divider is coupled into a tuned amplifier 118 that has a center frequency of about 11.5 kc. The tuned amplifier passes only the fundamental frequency of the divider 116 to the 7.1 mc. mixer 90. The signal from this tuned amplifier is mixed with input from the 1 and 10 kc. synthesizer. Output of the mixer 90 is coupled into a crystal filter 120.

The based pass of this filter is sufficiently wide to accommodate the vernier frequency range of 1400 c.p.s. and error from the 1 and 10 kc. synthesizer. Neglecting the error fom the 1 and 10 kc. synthesizer, the output of the 7.1 mc. mixer is 7.1000 mc. in the 000 position and 7.1005 in the 500 position. With the switch 108 in the 000 position, the output from the phase-locked oscillator is 110 kc. and is locked to that exact frequency by the 110 kc. spectrum point applied to the phase detector. This 110 kc. signal is divided by ten and applied to the 7.1 mc. mixer, where it is additively mixed with the 7.089 mc. output from the 7.089 mc. mixer. The resulting 7.1 mc. signal is then applied to the error loop of the 100 kc. synthesizer. Therefore, if an error exists in the 1 or 10 kc. oscillators 60, 62, the same error will exist in the 100 kc. injection frequencies. This error is then cancelled in the low and mid frequency mixers 26 in the following manner. Assume that the output from the 10 kc. oscillator should be 5.25 mc., but is 5.2502. Also assume that the output from the 1 kc. oscillator should be 1.852 mc. but is 1.8521 mc. Subtractively mixing these two frequencies results in an injection frequency to the low frequency mixer of 3.3981 mc., rather than the desired 3.3980 mc. Therefore, a 100 cycle error exists in the injection signal. The additive mixing of the 5.2502 mc. signal and the 10 kc. spectrum point (3.82 mc.) results in a frequency of 9.0702 mc. The additive mixing of the 1.8521 mc. signal and the 1 kc. spectrum point (0.129) results in a frequency of 1.9811 mc. Subtractively mixing the 9.0702 mc. and the 1.9811 mc. signals results in a frequency of 7.0891 mc. The 7.0891 mc. signal is mixed with the 11 kc. signal from the divider 116 resulting in a frequency of 7.1001 mc., which is mixed with the 10.747 mc. signal to produce a frequency of 17.8471 mc. If the output from the 100 kc. oscillator 70 is assumed to be 4.553 mc., then the 100 kc. injection frequency would be 22.4001 mc. The 100 kc. injection is then also 100 cycles high. Therefore, when the 1 and 10 kc. injection frequency of 3.3981 mc. (which is 100 cycles high) is subtractively mixed in the low frequency mixer with the output from the mid frequency mixer (which is 100 cycles high), the error will be cancelled. Therefore, since any error that existed in the 1 and 10 kc. injection also exists in the 100 kc. injection, the error is cancelled during the translation process.

The transmitter is tuned in 500 c.p.s. increments by locking the output of the 500 c.p.s. oscillator to 115 kc. When the 11.5 kc. from divider 116 is mixed with the 7.089 mc. error frequency, a frequency of 7.1005 mc. is obtained and the 100 kc. injection frequency is 500 c.p.s. high. Thus, the output from the mid frequency mixer may be varied in 500 c.p.s. increments.

The 500-kc. IF is converted to the desired RF as follows. Assume that the panel controls are set for a frequency output of 13,492,500 c.p.s. The 1- and 10-kc. injection is that frequency of the 10-kc. oscillator corresponding to the 10-kc. digit (9) minus that frequency of the 1-kc. oscillator corresponding to the 1-kc. digit (2). This results in an injection frequency (5.16 mc. minus 1.852 mc.) of 3.308 mc. The 3.308 mc. is subtractively mixed with the 500-kc. IF in the low frequency mixer producing a second IF of 2.808 mc. This signal is filtered and applied to the mid frequency mixer to be subtractively mixed with the 100-kc. injection. To determine the 100-kc. injection frequency, it must be first noted whether the mc. digit to be used results in a hi or lo frequency. In this case, the selected mc. digits (13) are in the hi-band. Therefore, the 100-kc. injection must correspond. It also must be noted that the switch 108 is in the 500 position. Therefore, the correct 100-kc. injection frequency is 32.8005 mc. When the 2.808 mc. is subtratively mixed with the 32.0005 mc. in the mid frequency mixer, the resulting third IF is 29.9925 mc.

This frequency is filtered and applied 'o the high frequency mixer, where it is subtractively mixed with the mc. injection corresponding to the selected mc. digits (13). This results in the desired output frequency of 13.4925 mc. (29.9925−16.5=13.4925). Similarly, the 500-kc. IF frequency can be translated to any one of the possible 56,000 operating channels.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A wide band transmitter for operating at any frequency from 2.0 to 30.0 mc. comprising:

(A) a frequency standard for providing independent reference outputs of 500 kc., 1 mc., and 10 mc. respectively, (B) an mc. synthesizer coupled to the 1 mc. output of the frequency standard and tunable relative to the 1 mc. as a reference to provide 2.5 mc. or 23.5 mc. or any 500 kc. step therebetween, (C) a spectrum generator means coupled to the 500 kc. output of the frequency standard and responsive thereto to provide four distinct outputs, one output providing a spectrum of ten frequencies including 15.3 mc. and 16.2 mc. and all 100 kc. frequency steps therebetween, another output providing a spectrum of ten frequencies including 3.82 mc. and 3.91 mc. and all 10 kc. frequency steps therebetween, another output providing a spectrum of ten frequencies including 0.122 mc. and 0.131 mc. and all 1 kc. frequency steps therebetween, and the other output providing the frequency steps 0.110 mc. and 0.115 mc., all of which are referenced to the 500 kc. of the frequency standard, (D) 1 and 10 kc. synthesizer including (1) an oscillator selectively tunable in 1 kc. steps to provide an output at one of ten frequencies between 1.850 mc. and 1.859 mc. inclusive, (2) another oscillator selectively tunable in 10 kc. steps to provide an output at one of ten frequencies between 5.16 mc. and 5.25 mc. inclusive, (3) a mixer coupled to the outputs of both oscillators to provide the difference frequency of the outputs of both oscillators, as the output of the 1 and 10 kc. synthesizer, (4) a mixer coupled to the output of the 1.850–1.859 mc. oscillator and to the 0.122–0.131 output of the spectrum generator to provide that sum frequency which is closest to 1.981 mc.

(5) a mixer coupled to the 5.16–5.25 mc. oscillator and the 3.82–3.91 mc. output of the spectrum generator to provide that output which is closest to 9.07. mc., (6) a mixer coupled to the outputs of the 1.981 mc. mixer and 9.07 mc. mixer to provide the difference frequency, (E) a 500 c.p.s. synthesizer including (1) an oscillator DC tunable to a frequency over the band 108 to 122 kc. inclusive, (2) a phase detector having two inputs one of which is coupled to 0.110–0.115 mc. output of the spectrum generator, (3) a gate operable for coupling or for isolating output from the 108–122 kc. oscillator to the other input of the phase detector, (4) selectively controllable DC means for setting the oscillator at 110 kc. and for setting the gate for coupling, or for setting the oscillator at 115 kc. and for setting the gate for coupling, or for continuous tuning of the oscillator and for causing the gate to isolate the oscillator and the phase detector, (5) said phase dectector being operable to provide an output for adjusting the tuning of the oscillator when the oscillator frequency drifts relative to 0.110 mc. or 0.115 mc. of the spectrum generator, (6) means coupled to the 108–122 kc. oscillator and operable to provide an output that is one-tenth the output frequency of the oscillator, (7) a mixer responsive to the output from the 7.089 mixer and the output of the 108–122 kc. oscillator divided-by-ten to provide the sum frequency of 7.1 mc., (F) a 100 kc. synthesizer including (1) a 100 kc. oscillator for providing ten frequency steps including 4.553 mc., 5.453 mc. and all 100 kc. frequency steps therebetween, (2) a mixer responsive to the output of the 100 kc. oscillator and the 15.3–16.2 mc. output of spectrum generator to provide the difference frequency closest to 10.747 mc.

(3) a mixer responsive to the output of the 7.1 mc. mixer and the 10.747 mc. mixer to provide the sum frequency of 17.874 mc., (4) a mixer responsive to the output of the 17.847 mc. mixer and to the 10 mc. output of the frequency standard to provide the sum frequency of 27.847 mc., (5) hi-band and lo-band mixers each having two inputs, one input of each being coupled to the output of the 100 kc. oscillator, the other input of the hi-band mixer being coupled to the output of the 27.847 mc. mixer and the other input of the lo-band mixer being coupled to the output of the 17.847 mc. mixer, said lo-band mixer being operable to provide the sum frequency between 22.4 and 23.3 mc., said hi-band mixer being operable to provide the sum frequency between 32.4 and 33.3 mc., both the hi-band and lo-band mixers providing the output of the 100 kc. synthesizer, (G) modulator means for combining 500 kc. of the reference standard and the signal to be transmitted to provide 500 kc. modulated with the signal, (H) low, mid and high frequency mixer means, (I) a code generator for selecting the frequency of the mc. oscillator and for selecting the 22.4–23.3 mc. or 32.4 to 33.3 of the 100 kc. synthesizer for the low, mid and high frequency mixer means, (J) said low frequency mixer being operable to mix the modulated 500 kc. and the 3.301–3.400 mc. output of the 1 and 10 kc. synthesizer to provide the difference frequency 2.8–2.9 mc., said mid frequency mixer being operable to mix the 2.8–2.9 mc. output of said low frequency mixer and 22.4–23.4 or 32.4–33.3 mc. of the 100 kc. synthesizer to provide 19.5–20.5 mc. or 29.5–30.5 mc. said high frequency mixer being operable to provide the 2.0–30.0 mc. output of the transmitter.

2. A synthesizer operable to provide any frequency between 10.8 kc. and 12.2 kc. comprising a reference source of 0.110 and 0.115 mc., a phase detector operable to compare two essentially identical input frequencies and to provide a DC output which is a function of drift of one input relative to the other input, one input of the phase detector being coupled to the reference source, a DC controllable gate between the output of the DC tunable oscillator and the other input of the phase detector, divide-by-ten means for converting output of the oscillator to a frequency between 10.8 and 12.2 kc., a controllable DC source having first, second, and third terminals and providing one constant voltage level at the first terminal for setting the oscillator to 11.0 kc. output, and providing another constant voltage level at the second terminal for setting the oscillator to 11.5 kc. output, and selectively providing any voltage level between particular limits at the third terminal for continuously tuning the oscillator between 108 kc. and 122 kc.

a vernier control for selecting the third voltage level, another voltage source having first, second, and third terminals, wherein the first and second terminals are connected in common and are at a constant voltage level for setting the gate to couple the oscillator to the phase detector, and the third terminal being at another voltage level for setting the gate to isolate the oscillator and the phase detector, a switch having two ganged switch elements movable together to the first terminals, the second terminals, and the third terminals, one switch element being connected to the oscillator and the other switch element being connected to the gate, whereby when the switch elements engage the first terminals the oscillator output is 11.0 kc. and the oscillator is coupled to the phase detector, and when the switch elements engage the second terminals, the oscillator output is 11.5 kc. and the oscillator is coupled to the phase detector, and when the switch elements engage the third terminals, the oscillator is isolated from the phase detector and the oscillator output is selectively tunable by the vernier control to any frequency from 108 kc. to 122 kc.

References Cited

UNITED STATES PATENTS

| | | | |
|---|---|---|---|
| 2,870,330 | 1/1959 | Salmet | 331—22X |
| 2,886,708 | 5/1959 | Perkins et al. | 331—22X |
| 3,208,005 | 9/1965 | Guttman et al. | 331—2 |
| 3,340,474 | 9/1967 | Leypold | 325—183 |
| 3,378,774 | 4/1968 | Leypold | 325—184 |

ROBERT L. RICHARDSON, Primary Examiner

U.S. Cl. X.R.

325—153; 331—22, 31, 39, 40